US009420002B1

(12) United States Patent
McGovern et al.

(10) Patent No.: US 9,420,002 B1
(45) Date of Patent: Aug. 16, 2016

(54) AUTHORIZATION SERVER ACCESS SYSTEM

(71) Applicants: Mark McGovern, Washington, DC (US); James Matthew Dew, Austin, TX (US)

(72) Inventors: Mark McGovern, Washington, DC (US); James Matthew Dew, Austin, TX (US)

( * ) Notice: Subject to any disclaimer, the term of this patent is extended or adjusted under 35 U.S.C. 154(b) by 0 days.

(21) Appl. No.: 13/829,412

(22) Filed: Mar. 14, 2013

(51) Int. Cl.
*H04L 29/06* (2006.01)
(52) U.S. Cl.
CPC ...................................... *H04L 63/20* (2013.01)
(58) Field of Classification Search
CPC .............................. H04L 63/20; H04L 63/108
USPC ............................................................ 726/1
See application file for complete search history.

(56) References Cited

U.S. PATENT DOCUMENTS

| | | | | |
|---|---|---|---|---|
| 6,430,613 | B1 * | 8/2002 | Brunet et al. | 709/223 |
| 7,966,648 | B2 * | 6/2011 | Park et al. | 726/2 |
| 2009/0007096 | A1 * | 1/2009 | Chavez | H04L 63/20 |
| | | | | 717/176 |

* cited by examiner

*Primary Examiner* — Longbit Chai

(57) ABSTRACT

Systems and techniques are provided for authorizing restricted action (e.g., data access) requests using a tiered arrangement. A rule set is generated based on a policy received by an authorization server and is transmitted to a broker associated with an enterprise server. A restricted action request is received by an agent associated with the enterprise server and is provided to the broker associated with the enterprise server. The broker analyzes the request in view of the rule set and determines if the restricted action request should be granted or denied. The policy and/or rule set are updated based on activities and/or events within the system and a new rule set is generated based on the updated policy.

54 Claims, 15 Drawing Sheets

AUTHORIZATION SERVER ACCESS SYSTEM

BACKGROUND

Traditionally, a request for data access is originated by an endpoint device such as a mobile phone and access to the data is granted by a central server associated with the type of the data requested. As an example, a user using a mobile phone may activate a file sharing application. The user may input credentials such as a username and a password into the application and the application may transmit the credentials or information regarding the credentials to a file sharing server that verifies the credentials or information by comparing them to an existing validated list and grants the user and device access to a set of data and or services based on this comparison. If a match is found, the user is granted access. Generally the system does not require any further information or evaluate any further criteria to determine whether the user and/or the phone should be granted access to the data or services. Additionally, the central server can be limited to granting or denying access based only on the information contained within the central server, and is isolated from external knowledge to supplement the access decision.

Access decisions are generally based on predefined criteria which, once established, are deployed by a central server. As an example, a central server may require that a user input a username and password and may optionally input a company name, at a first time. An update to the security settings for the central server may be modified such that a username, password, and company name are be required to gain access to the central server. Traditionally, the change in security setting is implemented when a decision to implement the change is made and the code to execute the change is committed.

BRIEF SUMMARY

According to implementations of the disclosed subject matter, an authorization server may receive a policy that defines a restricted action for an endpoint device. The authorization server may generate one or more rule sets based on the policy for one or more enterprise servers providing respective unique services. The authorization server may distribute the one or more rule sets to one or more respective enterprise servers. The authorization server may update the one or more rules sets based on observed events, activities, time and the like. An enterprise server may receive a request to perform the restricted action from an endpoint device and may determine based on the rule set received from the authorization server that the endpoint device is prohibited from performing the restricted action. The determination may be based on comparing an attribute or claimed identity received from the endpoint device to one or more known values or identities and determining that the attribute does not correspond to one or more known values or identities. More specifically, the determination may be based on one or more logical criteria contained in the rule set received from an authorization server and may include evaluation of values related to identity, the remote device, the data or the service for which access is being requested, time, or the like. Based on the determination, the enterprise server may prevent the endpoint device from performing the restricted action.

According to implementations of the disclosed subject matter, an authorization server may receive a policy that defines a restricted action for an endpoint device, the policy based on at least one service supported by an enterprise server. The authorization server may generate a rule set for an enterprise server providing a service, based on the policy. The authorization server may generate a second rule set for a second enterprise server providing a second service, based on the policy. The authorization server may distribute the first rule set and the second rule set to the respective enterprise servers.

Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
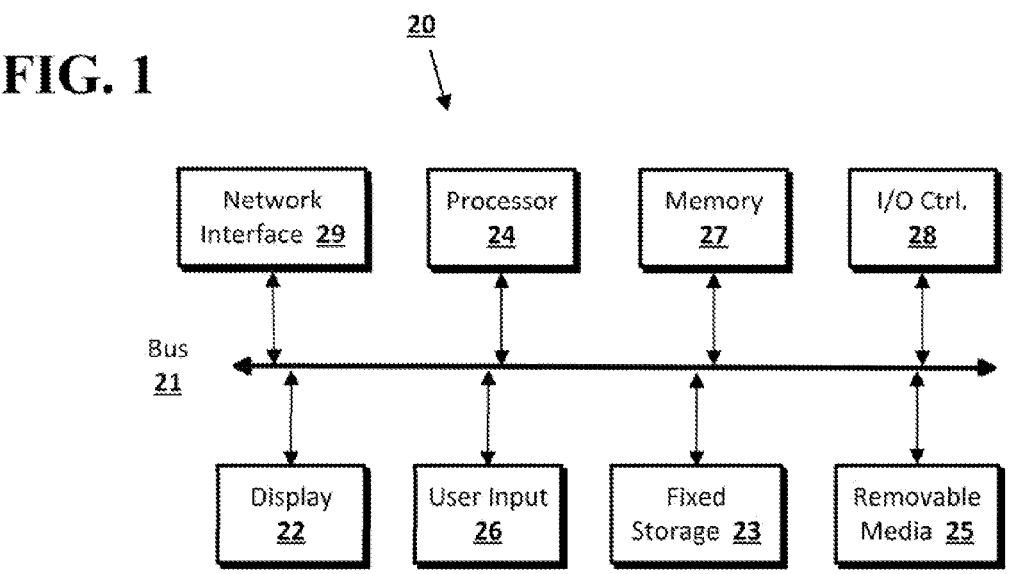
FIG. 1 shows a computer according to an implementation of the disclosed subject matter.

Access to a computing system via a centralized server granted based only on credential verification or authentication can allow a user to be exposed to data not intended for the user. Exposure to unintended data can be a security concern, and, thus, preventing exposure on one or more levels may be beneficial. The ability to control access based on the data type, service type, amount, or level as well as controlling access based on recipient attributes such as user attributes, user account attributes, user credentials, user device attributes, user system configuration settings, historical activities, or the like, may be beneficial. Further, quickly responding to a data request made by an endpoint device or quickly altering the criteria used in making access control decisions may also be beneficial.

As disclosed herein, a tiered authorization arrangement including an authorization server, one or more enterprise servers, and one or more endpoint devices can be implemented to control access to data and services. The tiered arrangement can allow efficient policy distribution via an authorization server while enhancing request response times by allowing a request for access by an endpoint device to be quickly analyzed by an enterprise server. According to an implementation, an authorization server may be configured to receive a policy defining criteria for a response to a restricted action (e.g., a data access, service access, or the like) by an endpoint device. The authorization server may generate a rule set based on the policy and provide the rule set to an enterprise server that receives a request for access to data or service from the endpoint device. The enterprise server may approve or deny the request based on the rule set received from the authorization server and, accordingly, permit access to the requested data or service to the endpoint device. As disclosed herein, an authorization server may be configured to accept a policy and generate a rule set based on the policy. The authorization server may receive the policy from any applicable source, such as a policy administrator, a dynamic policy generator, a script to policy convertor, or the like. The authorization server may generate a rule set based on the received policy that defines the criteria for evaluating requests for a restricted action, and may include appropriate response to one or more restricted action requests by an endpoint device. The authorization server may generate rule sets, based on the policy, for one or more enterprise servers and distribute them to the respective enterprise servers. An enterprise server may include a broker component that communicates with the authorization server and receives a rule set from the authorization server. The broker component may communicate with an agent component at the enterprise server that receives requests for access to data from one or more endpoint devices, as well as endpoint attributes such as user information, device information, device location, data type, data amount, device network information, or the like. The agent may provide the broker with the data request and endpoint attributes and the broker may grant or deny at least a portion of the data request based on the rule set provided by the authorization server. Additionally, the arrangement may store data related to system occurrences such as authorization requestor information, device information, data related information, permission information, and the like. The system log may be stored at an authorization server or at a remote location such as a remote server, cloud server, remote database, or the like.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
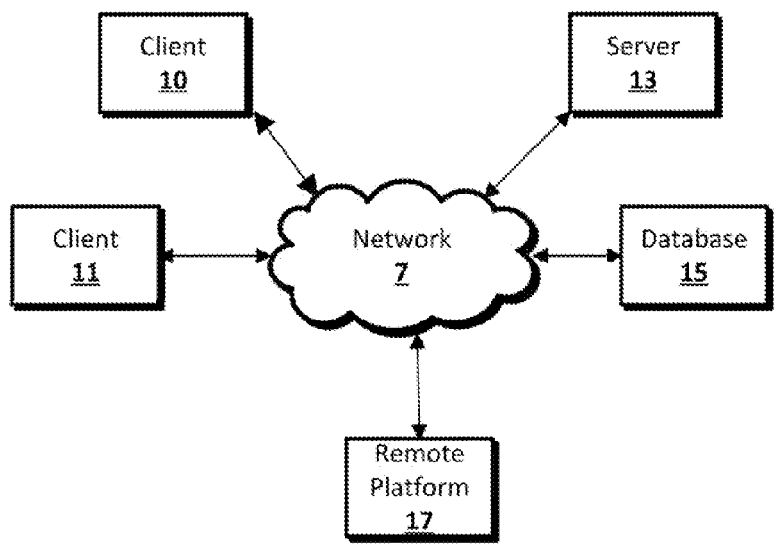
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
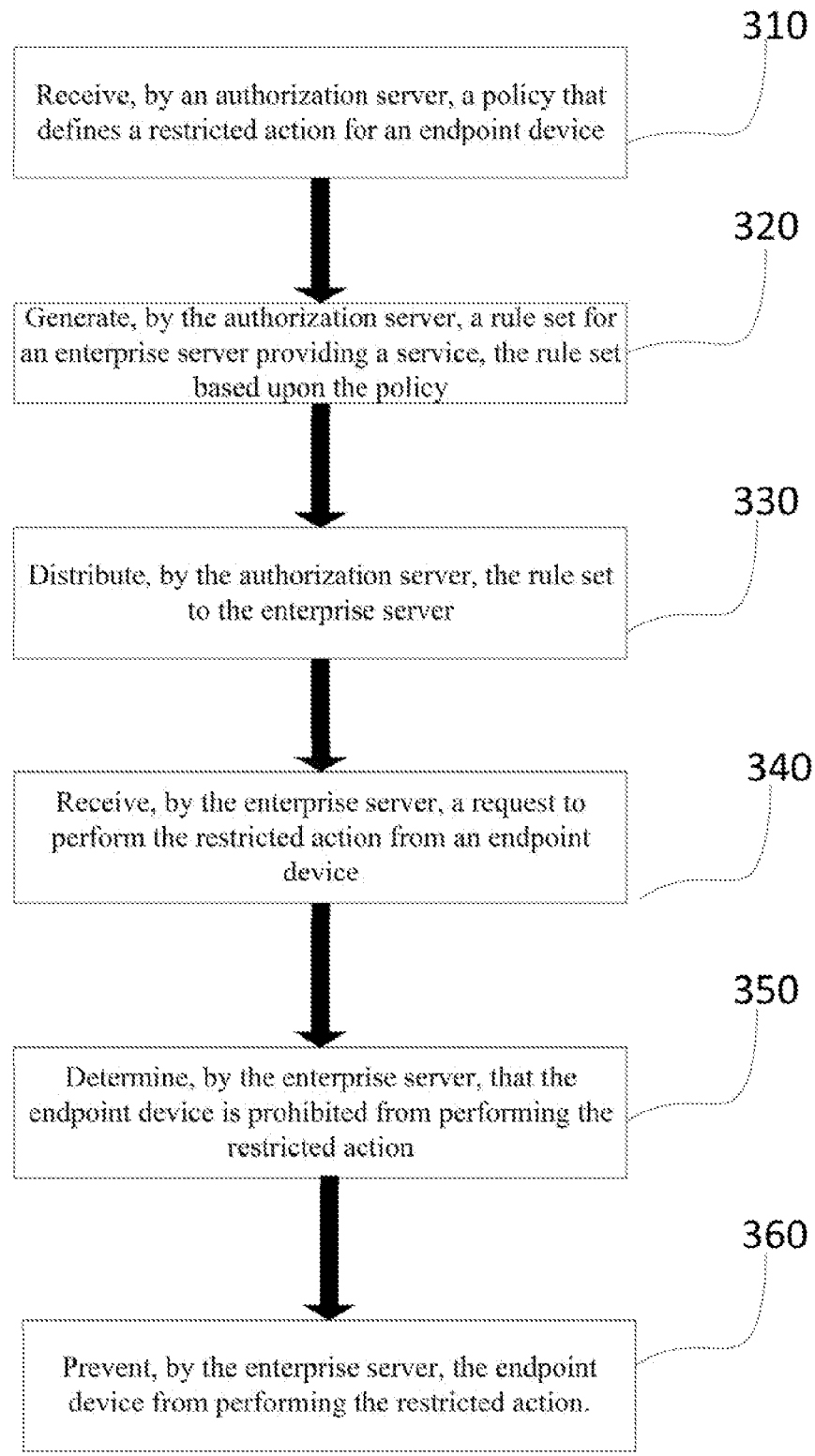
FIG. 3 shows an example process for preventing an endpoint device from performing a restricted action, according to an implementation of the disclosed subject matter.
Figure 13A:
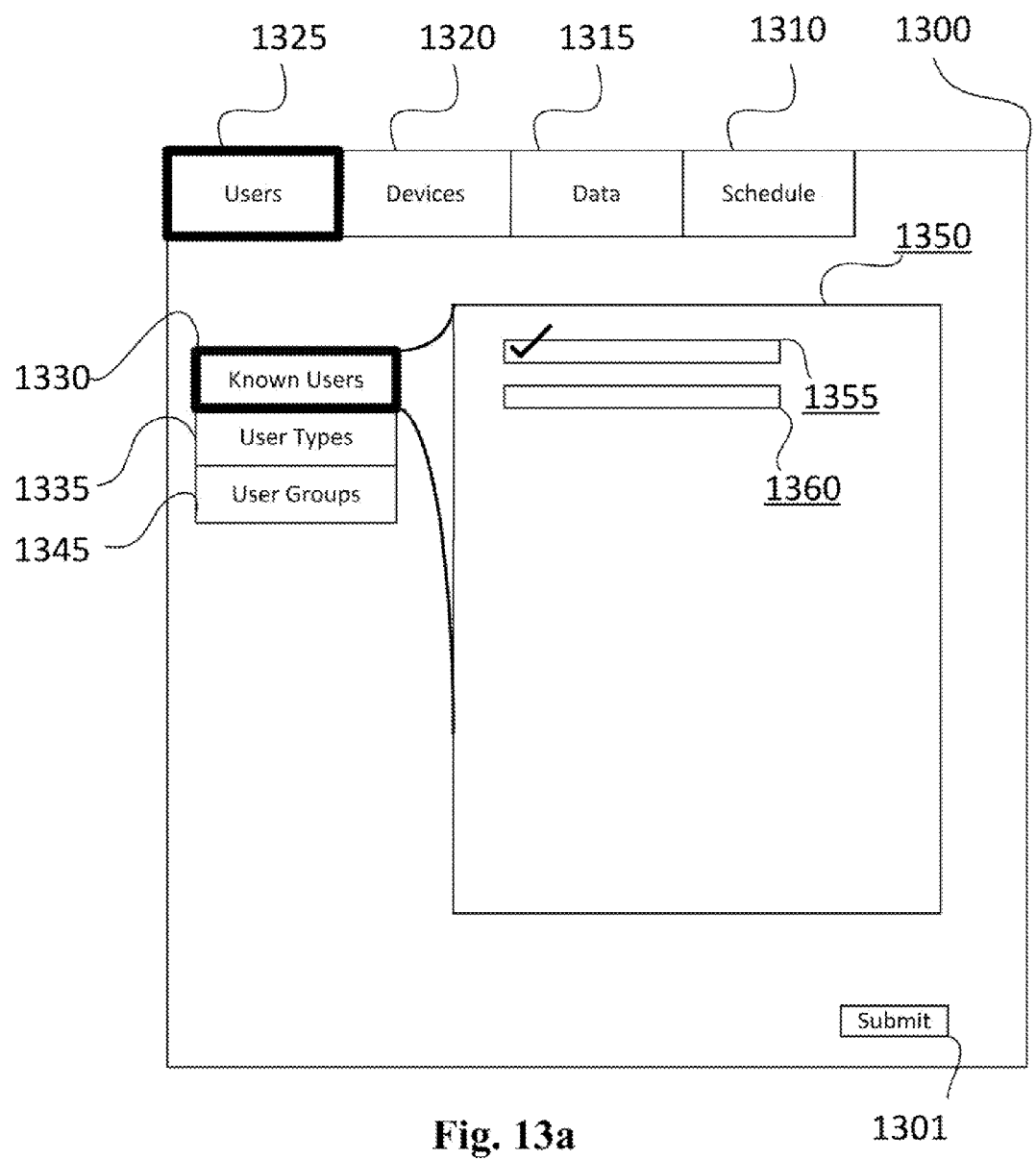
FIG. 13a shows an example arrangement of a selected Users tab in a policy input user interface, according to an implementation of the disclosed subject matter.

According to an implementation of the disclosed subject matter, as shown in FIG. 3 at step 310, an authorization server may receive a policy that defines a restricted action for an endpoint device. The policy may contain one or more subjects, actions, conditions, alerts, remediations, or the like. A policy administrator may develop a policy by inputting data into a user interface that provides options for selecting the parameters and logic that can be used to assess restricted action access requests. As an illustrative example, as shown in FIG. 13a, a user may input policy criteria using a user interface 1300. The user interface may contain multiple tabs such as a Users tab 1325, a Devices tab 1320, a Data tab 1315, and a Schedule tab 1310 that allow a user to input multiple policy criteria using one or more of the tabs and commit the policy criteria using a submit button 1301. The user interface and a workflow for defining a policy may be provided by the authorization server or any other server that can deliver the user input to the authorization server. Additionally, the user interface may provide a policy administrator with one or more options obtained by querying an external data source. For example, the authorization server may query an enterprise identity data store such as a Lightweight Directory Access Protocol® or Active Directory® and receive a user or group list that is provided to a policy administrator via the user interface. A policy administrator may commit an initial policy at a first time and, at a second time after the first time, update the previously committed policy, input a new policy, or delete a previously committed policy. The policy input by the user may define an access action such as expressly permitting access, expressly denying access, permitting or denying access to a subset of the data, or the like. The criteria input by the user may result in a policy that can evaluate and utilize data from one or more components of the arrangement and sources for the data may be any applicable data source such as local context data, a local context state, a system state, remote component data, historical data, or the like. The authorization server receiving the policy criteria from a user may evaluate whether the resulting policy is complete, enforceable, and/or whether it conflicts with one or more other policies that are currently enforced or in a test mode. If a proposed policy is determined to be incomplete, unenforceable, or conflicting, then the authorization serve may take an appropriate action such as modifying the policy, alerting a policy administrator, replacing an existing policy, or the like. Notably, an authorization server may be better equipped to generate policies and rule sets for one or more enterprise server in comparison to individually managing policies at the enterprise server level. Generating policies and rule sets at the authorization server level can allow for a top down architecture, separating policy generation and policy enforcement such that the policy generation is centralized at an authorization server for multiple enterprise servers and policy enforcement is efficiently conducted at the enterprise server level.

Figure 6:
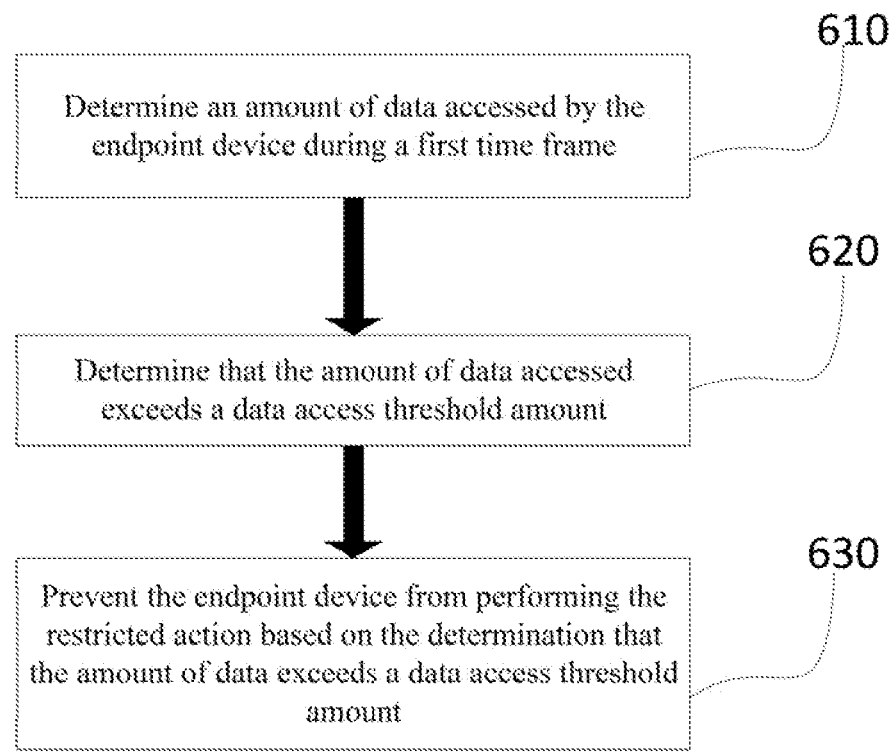
FIG. 6 shows an example process for preventing an endpoint device from performing a restricted action based on amount of data accessed, according to an implementation of the disclosed subject matter.

A policy may define conditions that enable an enterprise server to grant or deny restricted action requests by an endpoint device, and can include any applicable condition such as characteristics of past behavior associated with an identity or device, data amount requested, historical data about data requests, time frame of data requested, historical data about data request time frame, past activities, data characteristics, or the like. Conditions based on past behavior or historical data may result in policies that dynamically develop as one or more endpoint devices requests restricted access as the requests may themselves become historical data once they are analyzed. Notably, conditions may enable a policy to use data from throughout the system to make, evaluate, and authorize requests for access. As an example, a user may request access to computer code using a mobile phone. The mobile phone may transmit the data request to a code enterprise server that evaluates the request based on a rule set, derived from the policy, provided to the code enterprise server by an authorization server. The policy may contain the following condition:

if current data(request_amount)<1.5*historic_data(highest_request amount);
  then return current_data(content);
  else return (denial response);

The condition in the example policy causes the code enterprise server to determine the amount of data currently being requested, and providing the data to the mobile phone if the currently requested data amount is no greater than 150% of any previously requested amount. If the amount of data exceeds 150% of any previously requested amount then the endpoint device receives a message stored under a "denial response" variable such as, for example, a message stating that the "Data requested exceed authorized amount." Notably, the example policy may prevent an enterprise server from providing unprecedented amounts of data to an endpoint device, which may ensure that the enterprise server is not over burdened by large data amount requests. Accordingly, as shown in FIG. 6, the system may determine an amount of data accessed by an endpoint during a first time frame at step 610 and determine that the amount of data accessed exceeds a data access threshold amount at step 620. At step 630, the endpoint device may be prevented from performing the restricted action (e.g., receiving access to data) based on the determination. It will be understood that multiple conditions may be included in a policy and, accordingly, although the data request meets one on or more conditions, one or more other conditions may prevent an endpoint device from receiving the data.

Figure 7:
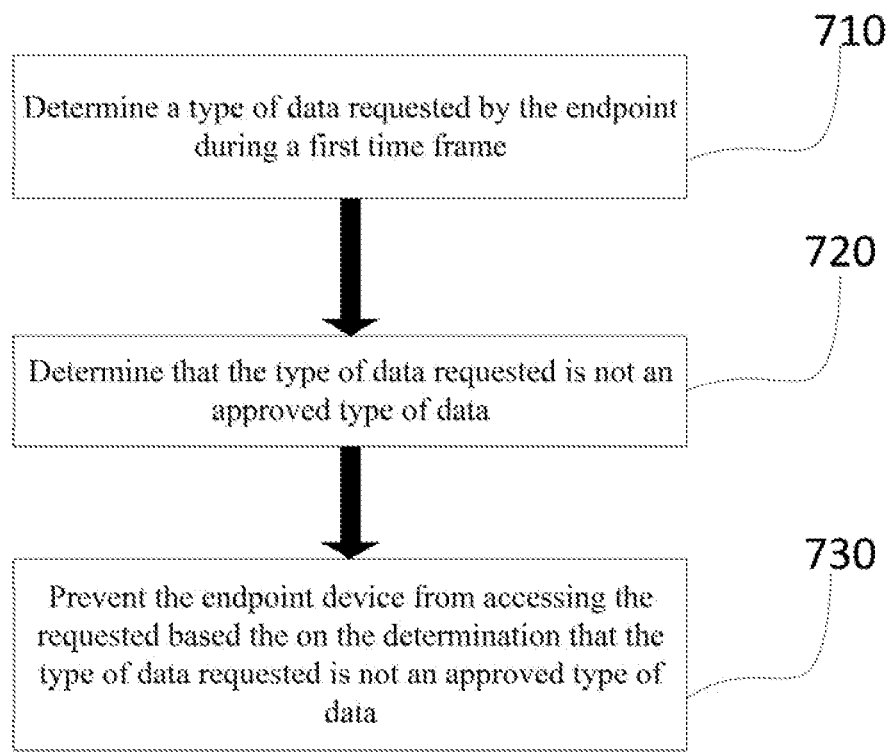
FIG. 7 shows an example process for preventing an endpoint device from performing a restricted action based on type of data accessed, according to an implementation of the disclosed subject matter.
Figure 13B:
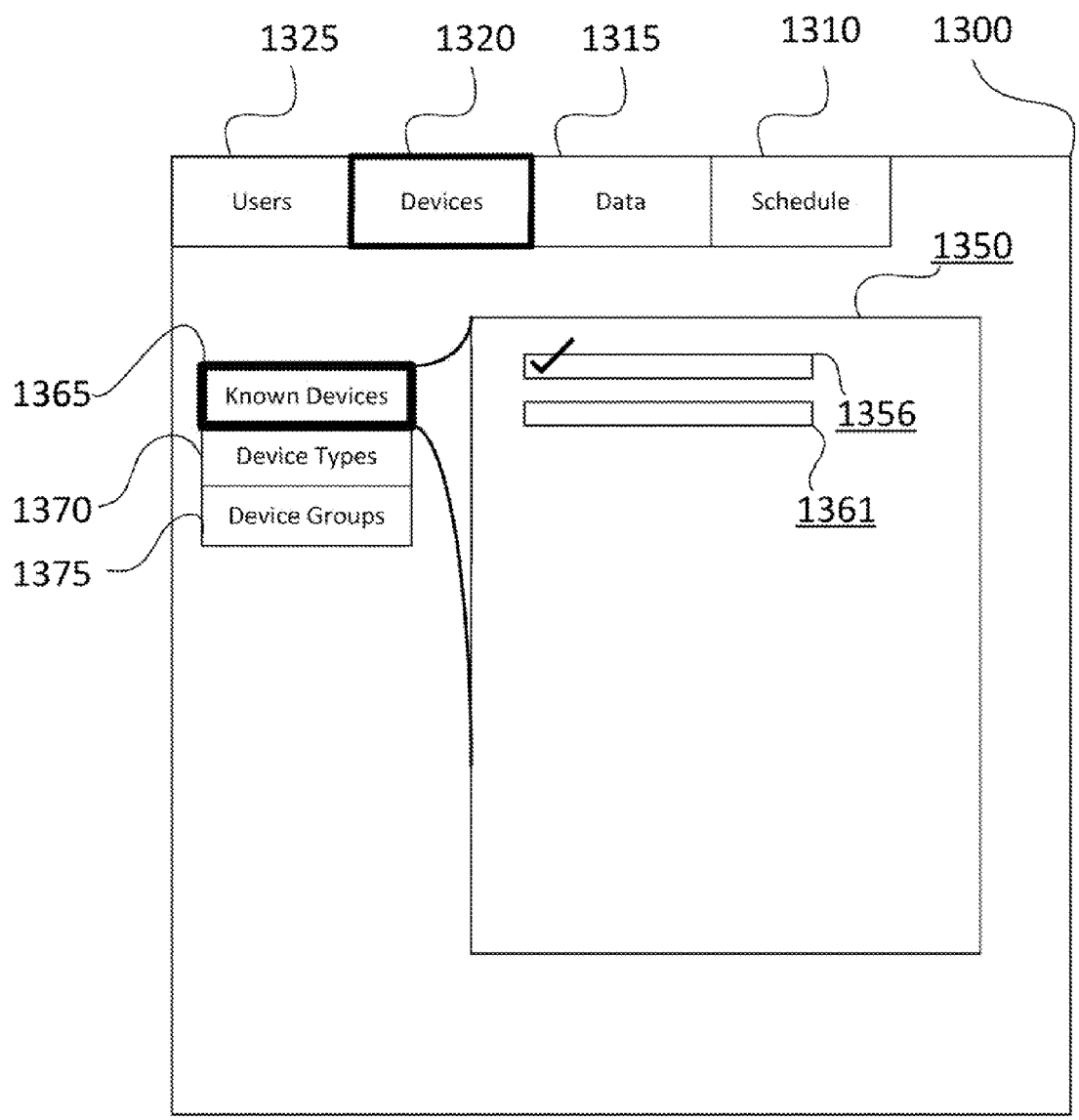
FIG. 13b shows an example arrangement of a selected Devices tab in a policy input user interface, according to an implementation of the disclosed subject matter.
Figure 13C:
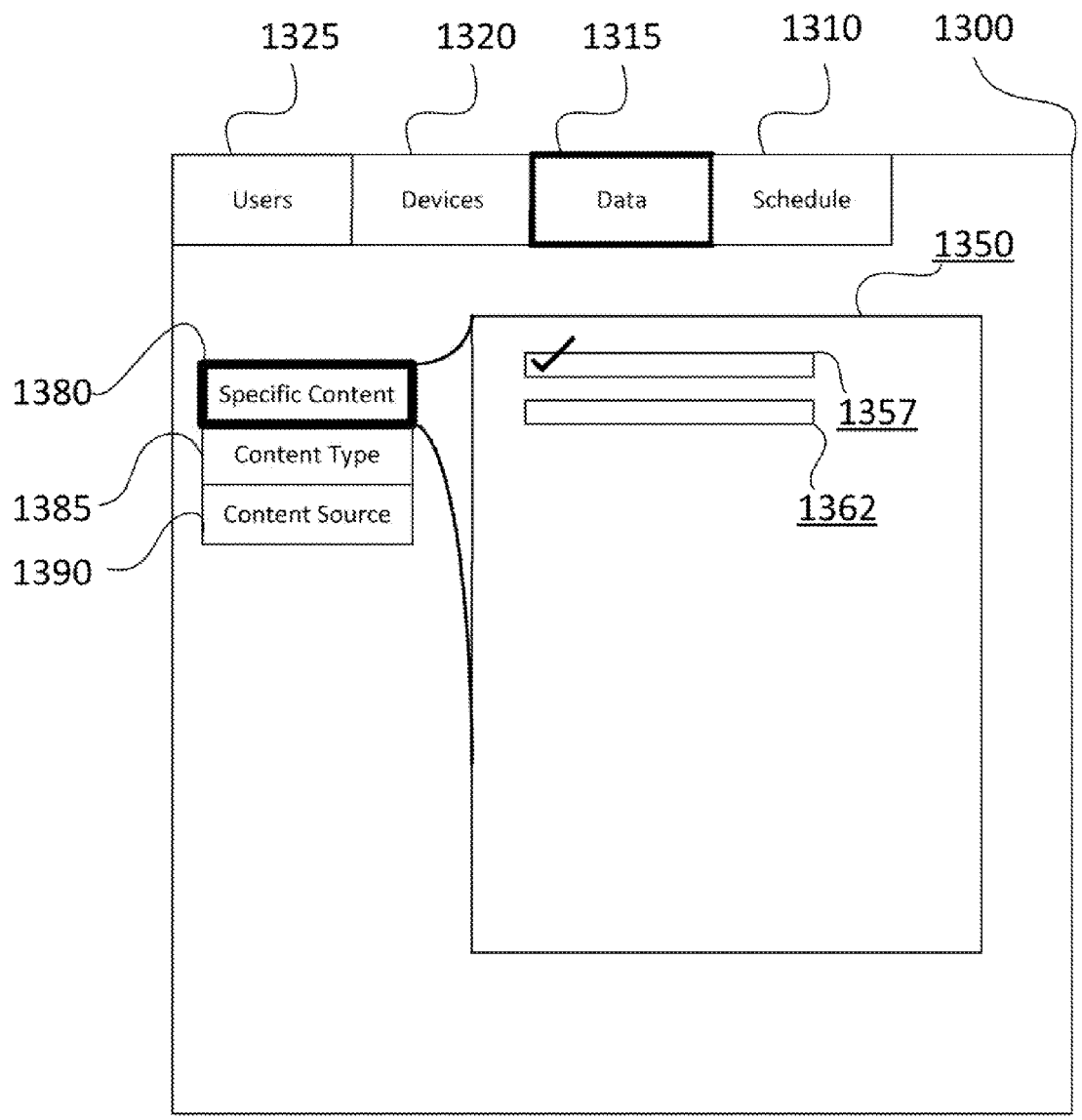
FIG. 13c shows an example arrangement of a selected Data tab in a policy input user interface, according to an implementation of the disclosed subject matter.

In an illustrative example of inputting a policy with a data based condition using a user interface, as shown in FIG. 13*c*, a policy administrator may select a Data tab 1315 and further select a sub-tab Specific Content 1380. The policy administrator may select certain specific content to which the policy can allow access 1357 and may select or deselect specific content 1362 to which the policy should prevent access. Specific content may be identified in any applicable manner such as a file name, a URL, a file location (e.g., type of server, specific server, present location such as a file path, general location such as a directory, etc.), or the like. According to techniques disclosed herein, as shown in FIG. 7, the system may determine a type of data requested by an endpoint device at step 710 and determine that the type of data requested is not an approved type of data at step 720. At step 730, the endpoint device may be prevented from performing the restricted action (e.g., receiving access to the data) based on the determination. Although not shown explicitly in FIG. 13*c*, the policy administrator may select a sub-tab for Content Type 1385 and may allocate types of content for which the policy grants or denies access. Content types may be any applicable content organization attribute such as type of file extension (e.g., .dat, .doc, .txt, .zip, etc.), hash value, signature, type of format, type of encryption, type of storage, a pattern, storage location, content characteristics, or the like. As an example, the policy administrator may select the Content Type sub-tab 1385 and select an option to generate a policy that allows an endpoint device to access webpages but prevents the endpoint device from accessing any documents. Additionally, the policy may utilize a wildcard or broad descriptor that identifies all data for an entire system. Alternatively, although not shown explicitly in FIG. 13*c*, the policy administrator may select a sub-tab for Content Source 1390 and may allocate sources of content from which the policy grants or denies access. A content source may be any applicable source based characteristic such as content generator information, content storage location, content author information, or the like. As an example, the policy administrator may select the Content Source sub-tab 1390 and select an option to allow an endpoint device to receive content that was previously uploaded via the endpoint device or via an account associated with the endpoint device and prevent the endpoint device from receiving content not previously associated with the endpoint.

Figure 5:
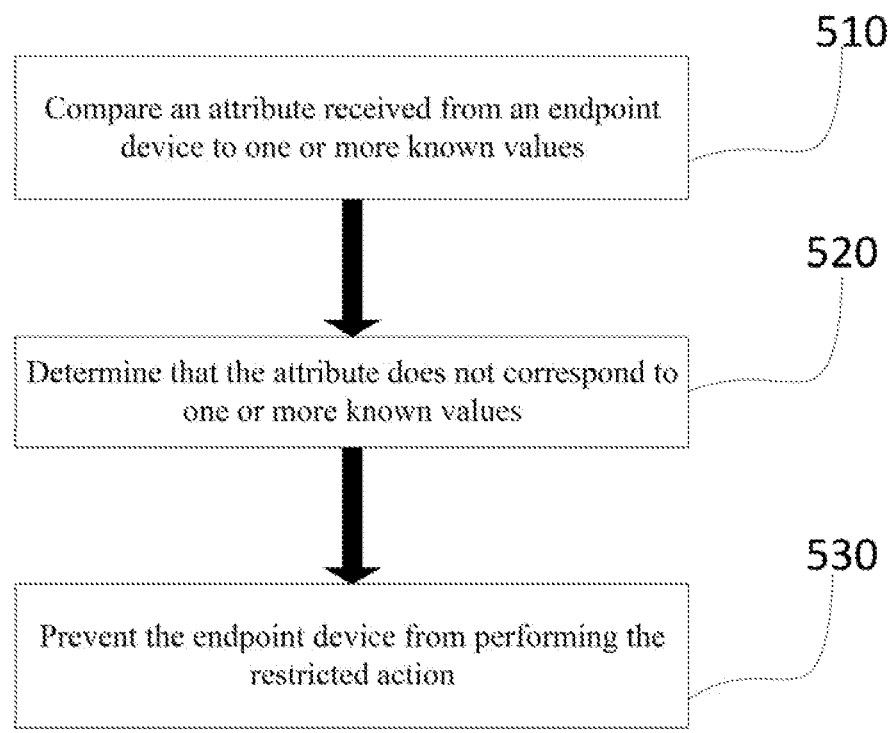
FIG. 5 shows an example process for preventing an endpoint device from performing a restricted action based on an attribute, according to an implementation of the disclosed subject matter.

Additionally, as shown in FIG. 5, the policy may define conditions that match criteria related to devices, such as identifying specific devices, classes of devices, membership of a device in a group, an exposed characteristics related to a device, a device operating system, applications or code loaded on a device, a past activity associated with a device, or the like. A policy administrator may develop a policy based on one or more devices to utilize access decision making based on the devices. As an example, a rule set based on a policy provided to an enterprise server may define the following condition:

if request_device(MDM)=has had Blacklisted_Application loaded on it within last 3 days
    then BLOCK return(denial response);
    else ALLOW return(requested data);

Accordingly, as shown in FIG. 5, the system may compare an attribute received from an endpoint device to one or more known values at step 510 and determine that the attribute does or does not correspond to one or more known values at step 520. At step 530, the endpoint device may be prevented from performing the restricted action (e.g., receiving access to data) based on the determination.

Additionally, as shown in FIG. 5, the policy may define conditions that match a claimed identity to criteria such as matching a specific identity to a known identity, matching to no known identity, presence as a member in a group, no presence as a member in a group, or the like. A policy administrator may develop a policy based on an identity to utilize access decision making based on lists and groups. As an example, a rule set based on a policy provided to an enterprise server may define the following condition:

if ((request_user(ActiveDirectory)=member of Management group) AND (request_user(VPN)=authenticated using StrongAuthentication)
    then ALLOW return(requested data);
    else DENY return(denial response);

The condition in the example policy enables an enterprise server to make an access decision based on the presence of the user as a member of a group and the claimed identity as authenticated by a VPN in a manner such as using strong authentication credentials. An enterprise server identifies the identity being claimed, and uses this information to query the latest rule set obtained from an authorization server. An authorization server may update the rule set to include event information, including recent VPN authentications associated with a use. Accordingly, as shown in FIG. 5, the system may compare an attribute received from an endpoint device to one or more known values at step 510 and determine that the attribute does or does not correspond to one or more known values at step 520. At step 530, the endpoint device may be prevented from performing the restricted action (e.g., receiving access to data) based on the determination.

In an illustrative example of inputting a policy with a user and/or device based condition using a user interface, as shown in FIG. 13*a* and FIG. 13*b*, a policy administrator may select a User tab 1325 or Devices tab 1320 and further select a sub-tab Known Users 1330 or Known Devices, respectively. The policy administrator may select known users and/or devices that the policy can allow access to 1355 1356 and may not select or deselect known users and/or devices 1360 1361 that the policy should prevent access to. Known users and/or devices may be identified in any applicable manner such as a user identifier, an endpoint identifier, an account associated with a user or an endpoint device, a value associated with a user or endpoint device, or the like. Alternatively, although not shown explicitly in FIG. 13*a*, the policy administrator may select a sub-tab for User Type 1335 or Device Types

1370 and may allocate types of users for which the policy grants or denies access. A user type or device type may be any applicable user or organization characteristics such as user age, user association, user access level, user history, device model, device configuration, device operating system, installed software, or the like. As an example, the policy administrator may select the User Type sub-tab 1335 and select an option to generate a policy that only allows access to certain content if the user associated with a request is a member of a specific user group and the device associated with the request does not have a blacklisted application loaded upon it. Alternatively, although not shown explicitly in FIG. 13*a*, the policy administrator may select a sub-tab for User Groups 1345 or Device Groups 1375 and may allocate groups for which the policy grants or denies access. A user or device group may be based on any applicable grouping characteristic such as user and/or endpoint device membership, user grouping based on user demographic, groupings and datasets obtained from other enterprise systems, access based grouping, predetermined grouping, access level based grouping, operating system type, installed software, or the like. As an example, the policy administrator may select the User Group sub-tab 1345 and select an option to generate a policy that only allows access to certain content if the user associated with an endpoint requesting the content is in an adult group.

Additionally, the policy may define time based conditions such as a time range when the policy is enforced (e.g., time of day, day of week, start date, stop date, and/or specific time periods such as between a first time and a second time), frequency of requests, a time duration since a previous request, or the like. A policy administrator may develop a policy based on time to control access based on expected, allowed or disallowed time based behavior. As an example, a rule set based on a policy provided to an enterprise server may contain the following condition:

if current_Data(request time)=all(Allowed_time_range)
        then return current_data(content);
        else return (denial response);

The condition in the example policy causes an enterprise server to determine if the time that a data request is made is within a previously allowed time range recorded as an "Allowed_time_range" defined value. If the time that the request is made is within the allowed time range, then the requested data is sent to the endpoint device. Otherwise, the requested data is blocked and an appropriate response is transmitted to the device.

Figure 13D:
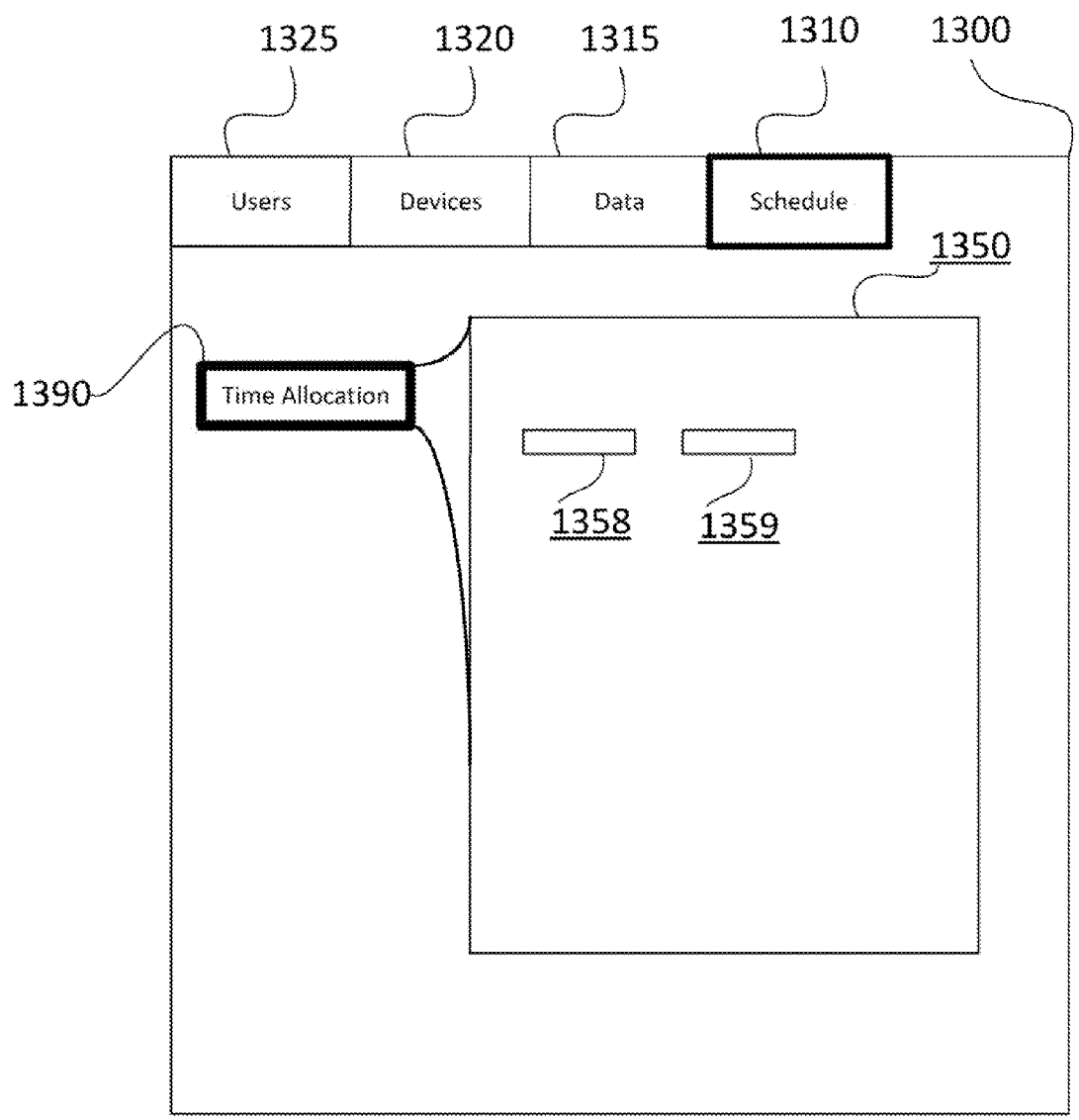
FIG. 13d shows an example arrangement of a selected Schedule tab in a policy input user interface, according to an implementation of the disclosed subject matter.

In an illustrative example of inputting a policy with a user based condition using a user interface, as shown in FIG. 13*d*, a policy administrator may select a Schedule tab 1310 and further select a sub-tab Time Allocation 1390. The policy administrator may select a range of time when an endpoint device can receive data by inputting a start time in a start box 1358 and a stop time in a stop box 1359. Alternatively, the time based restriction may be tied to the time a certain action occurred such as a previous data request, previous data transmittal, device boot, device location in a given area, or the like. As an example, a policy administrator may select an option to prevent an endpoint device from receiving data too frequently by requiring a ten minute waiting period between access requests. Accordingly, an endpoint device sending multiple data access requests may be limited to gaining access to additional data every ten minutes.

According to an implementation of the disclosed subject matter, a policy may be generated or updated based on events or activities observed throughout a system, as disclosed herein. The policy may be automatically generated or updated such that the policy is developed and converted into a rule set without human input. As an example, a VPN may take action in authenticating a user or enabling access to a network. Respective event information may be received by an authorization server that reevaluates existing policies based on the VPN activity, generates new rule sets and updates one or more enterprise servers. In this manner, enterprise servers may evaluate access requests based on information related to events and activities observed or reported by other components and servers.

System information may be accessed, stored and used for policy generation as well as updating and implementing policies. The information may be any system based information such as historical data regarding events, activities, an overall security status, policy enforcement actions, historical versions of external data sources, audit data related to system operation (e.g., observer performance of the system, system failures, system restarts, etc.), audit data related to user activities (e.g., access attempts, successful logins, changes made to a system configuration, data accessed by a user, policy changes made by a policy administrator, etc.), data regarding policies (e.g., historical information regarding creation, validation, deployment, enforcement, etc.), state information related to system activities, state of external data sources (e.g., Enterprise Identity database, Lightweight Directory Access Protocol®, Active Directory®, MDM dataset, etc.). The authorization server may generate policy parameters that may be utilized by a policy administrator in creating a policy. For example, the authorization server may contain historical data regarding data access frequency and, based on the availability of the historical data, may allow a policy administrator to set historical data based threshold limits for an endpoint device or user. As another example, the authorization server may contain a user list extracted from an Enterprise Identity database and may allow a policy administrator to select a subset of users that may access data from within the user list. The system information may be stored in any applicable storage such as locally on the authorization server, on a remote database, on a remote server, on a cloud based server, or the like.

System components including an authorization server, broker and/or agent may monitor the status of communications, configuration, processing, and performance and the like to detect error conditions and assess system status. Components may be capable of actions such as detecting, operating under error conditions, recovering from error conditions, or the like.

Figure 4:
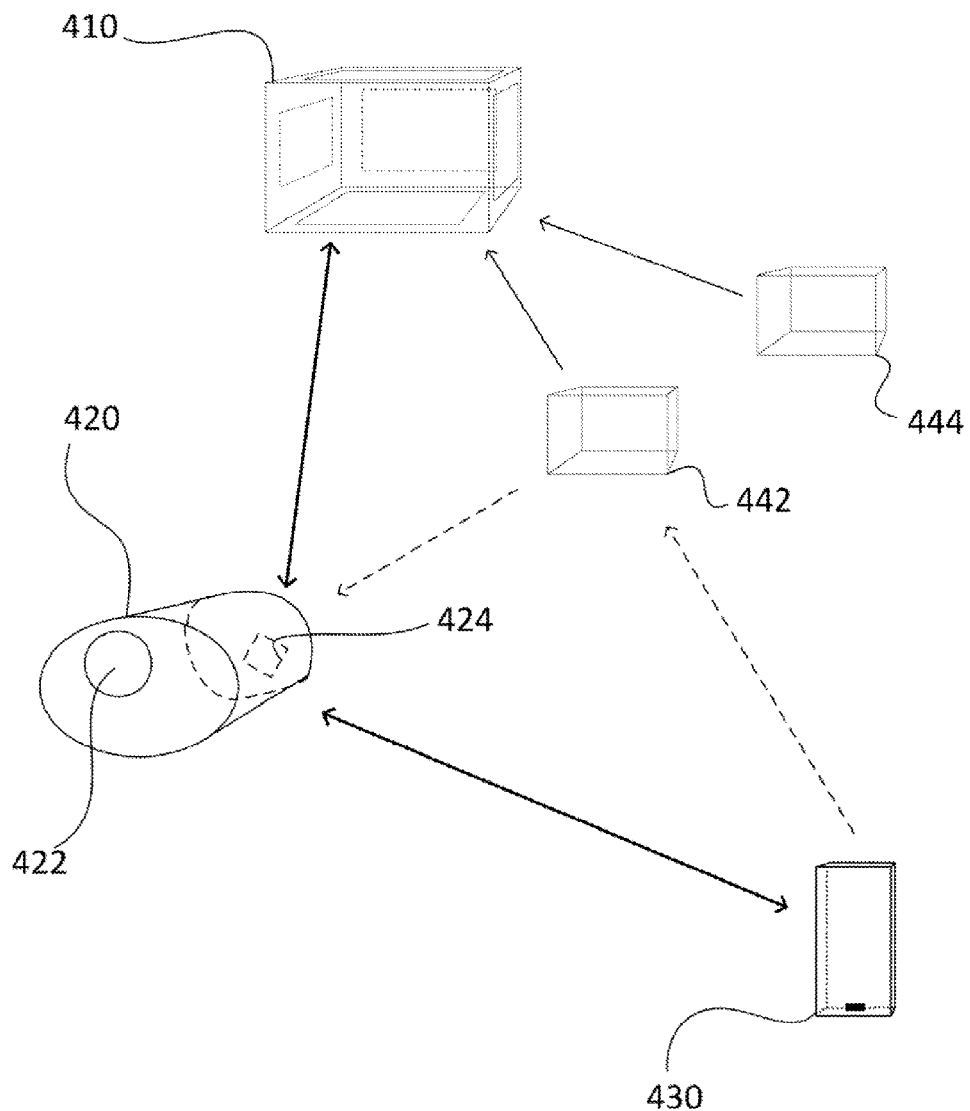
FIG. 4 shows an example arrangement of an authorization server, enterprise server, and endpoint device according to implementation of the disclosed subject matter.

According to an implementation of the disclosed subject matter, an authorization server may receive information related to one or more events. Event information may enable an authorization server to stay current with system changes, allowing up to date policies and rule sets. An event may be an indication that a change has been observed, detected or reported and may be packaged as a data message that provides information about the change in the system status or any data repository managed by external system components. A system status may be any applicable indicator related to a component in the overall arrangement such as, identity information, requested object information, time information, system component (e.g., a network device such as a router, switch VPN, Intrusion Detection System etc., a directory, an authentication service, a Mobile Device Management ("MDM") system a log system such as a syslong, an operating system log, etc.) information, location information, device information, server information, component structure, inter-component relations, storage attributes, component capability, system security state, a user defined policy, a system processing load, or the like. An event may be based on a counter value or total value such that an authorization server may be provided with a count of an action occurring or a threshold number of actions may be collected prior to an event is reported to the authorization server. A data repository may be any component that transmits or receives data and can interact with one or more enterprise servers. An event may be reported by an monitoring an external system component or by receiving automated message generated by an external system component as a result of any appropriate change such as a network connection status change, an interrupt detected by a server, a configuration change, or the like. Alternatively or in addition, an event may be detected and ingested by an authorization server and processed by Asynch Workers. Specific examples for events may include an IP address assignment (e.g., a VPN reporting an IP address assigned to a device), an update to a database containing user identity information (e.g., a change in an Active Directory® or Lightweight Directory Access Protocol®), a change reported or detected by a system containing device data (e.g., a device configuration change detected by an MDM), a system log created to record an action by a user on an unprotected system (e.g., A Windows Domain Controller log is updated when an attempt to authenticate user credential is made), a change in any network component, or the like. According to an implementation, an authorization server may actively monitor one or more external entities and may automatically receive information regarding any modifications made regarding the external entity based on the active monitoring. As an example, as shown in FIG. 4, an authorization server 410 may monitor an MDM component 444 and receive updates when a device configuration is changed. As another example, an authorization server 410 may receive automated updates from a VPN 442 when an endpoint device accesses the VPN 442.

According to an implementation of the disclosed subject matter, an authorization server may receive information related to one or more activities. Activity information may allow an authorization server to update or modify policies based on actions and requests local to an enterprise server. An activity may be a data message that provides information about access control requests observed and/or processed by an agent or broker in connection with an enterprise server as disclosed herein. Additionally, state changes and the general status of a broker or agent in connection with an enterprise server may be reported to an authorization server in the form of an activity. Notably, an event may be based on an action related to an entity external to an enterprise server, whereas an activity may be based on an action related to an enterprise server and/or a data request from an endpoint device. As an example, an endpoint device may submit a data request to an enterprise server and, based on analyzing the data request in view of a rule set, the endpoint server may reject the data request. A broker in connection with the enterprise server may report the data request and rejection (i.e., the activity) to an authorization server as an activity. The authorization server may store the activity information and/or may reevaluate existing policies based on the activity information.

An authorization server may process an event or activity as it is received. Regular processing may enable the authorization server and system to operate using current information such as when developing policies to evaluate access requests. An event or activity may trigger an authorization server to initiate any applicable action such as re-evaluating existing policies, generating a rule, modify a policy, modify a rule, generate new rule sets, initiate a report, initiate an alert, initiate automated data retrieval from an external system component, initiate system health checks and/or configuration changes to address factors that affect reliability or security such as performance issues or component failures, or the like.

As a more specific example, a change in a device A's configuration may be reported to an authorization server. The authorization server may re-evaluate one or more policies and if the re-evaluation results in a policy change then generate and distribute an updated rule set to an enterprise server. As another example, a device B may attempt accessing a file Y and either an enterprise server or authorization server may determine that a threshold, defined by a policy, for amount of access requests has been reached. Accordingly, the authorization server may initiate reporting and automate alerts based on the associated policy. As another example, an update to an Enterprise Identity Database may be reported to an authorization server which may then initiate a query to the database to discern any changes. As another example, an authorization server may receive an indication that a VPN may modify its security settings to reduce the level of authentication required to access the client. Accordingly, the authorization server may initiate a system health check to address the reduced security provided by the VPN and may take an appropriate action such as reducing the weight placed on the an endpoint device's ability to access resources via the VPN. An authorization server may maintain configuration information that includes both specific configuration information defined by users for one or more servers in the system as well as general information that defines a default value for these configurations. Default configuration settings may include parameters related to, for example, predetermined action to be taken upon failure of communications, a default mode (e.g., block or permit access) if a system operation degrades or fails to operate properly for a threshold period of time, a default mode for a server (e.g., block or permit access as a default parameter), an amount of time used to determine whether system communications or operations have failed, or the like. Further, an authorization server may manage configurations for one or more system components including brokers and agents associated with enterprise servers. The authorization server may be configured to make changes to an external entity, alter the configuration of an external entity, and/or alter data stored in an external entity. As disclosed herein, a change may be made as a result of remediation initiated during policy enforcement.

According to an implementation of the disclosed subject matter, a local authorization server may incorporate an external policy or rule set stored on an external authorization server or enterprise server to generate a local policy. The local authorization server may request the policy or rule set from an external authorization server or enterprise server or may automatically receive policy and/or rule set information from an external server. The local authorization server may incorporate the external policy and/or rule set by incorporating any applicable external component such as incorporating a rule set based decision, rule set or policy parameter, rule set or policy condition, rule set or policy logic, or the like. The local authorization server may automatically incorporate an external policy or rule set or may provide an external component to a policy administrator who may create or modify a policy by incorporating the external component. As an example, a local authorization server may receive an external policy that restricts data access by a device A between 10:00 PM and 7:00 AM EST, from an external authorization server. A policy administrator may receive the external policy via the local authorization server and may add a condition that that data access is prohibited unless the device A is located outside of country P. The resulting effective policy grants data access to device A if the request is made between 7:01 AM and 9:59 PM EST and if device A is located outside country P. It will be understood that the designators "local" and "external" are used to distinguish two sets of servers and that the sets of servers may be arranged proximate to each other either physically or according to any applicable topography arrangement. Notably, authorization and enterprise servers may share policies and rule sets with other authorization and enterprise servers, reducing the need to generate unique policies and rule sets and allowing the implementation of uniform policies across a system.

Figure 10:
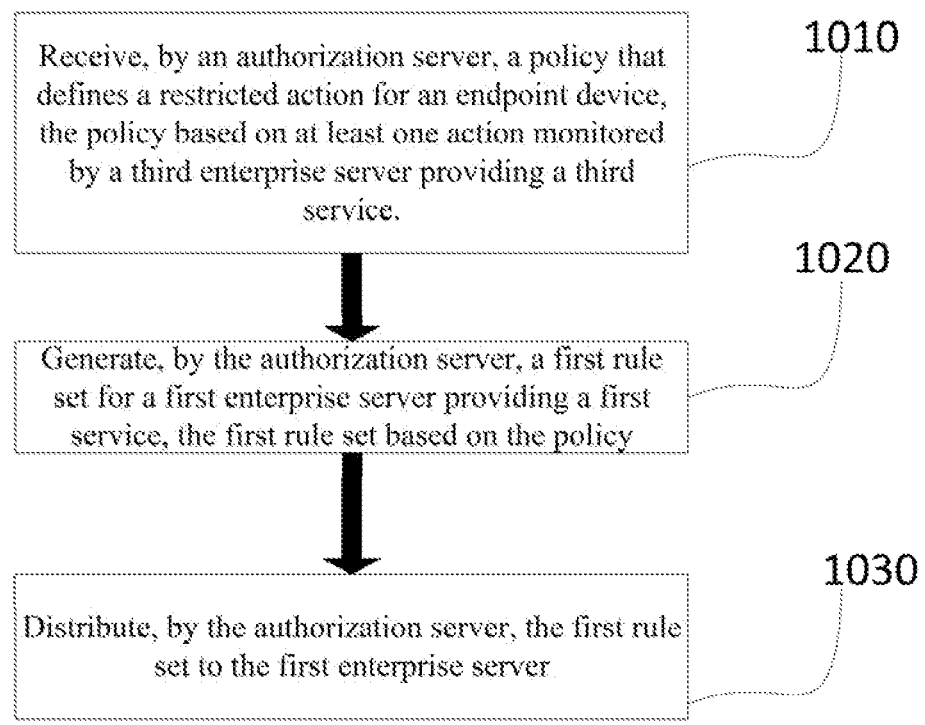
FIG. 10 shows an example process for distributing a rule set based on a policy based on an action monitored by an indirect enterprise server, according to an implementation of the disclosed subject matter.

According to an implementation of the disclosed subject matter, an authorization server may receive activity or event information for an action monitored by an external enterprise server providing an external service different than a service provided by a local enterprise server. As shown in FIG. 10, at step 1010, the authorization server may receive a policy based at least in part on the action information and may generate a rule set for the local enterprise server based on the policy at step 1020. At step 1030, the local enterprise server may receive a rule set based on the policy that incorporates an action monitored by an external enterprise server, from the authorization server. The action monitored by the external enterprise server may be an activity or an event reported from the external enterprise server to the authorization server or reported by the external server to a system component and, subsequently, from the system component to the authorization server. The local enterprise server may receive a request for data from an endpoint device and the local enterprise server may reject the request based on the action monitored by the external enterprise server. For example, a transit enterprise server may monitor the use of a travel card issued to a user for use on a subway. A security enterprise server may manage a user's building access card configured to grant access to a secured office building. An authorization server may automatically receive information from the transit enterprise server and may generate a policy for the security enterprise server that incorporates information from the transit enterprise server. Specifically, the policy may contain a condition that if the user's travel card is used at a station physically remote from the location of the office building within a given time period, then access to the building should not be granted. A rule set based on the policy may be provided to the security enterprise server and, thus, a user's access to the office building may be prohibited based on information received from the transit enterprise server (i.e., if the user's travel card is used at a station physically remote from the location of the office building). Notably, the travel card use monitored by the transit enterprise server may be incorporated into analyzing restricted access requests at the security enterprise server. An external enterprise server may provide information directly to an authorization server and the authorization server may update a policy and a corresponding rule set based on the information. Alternatively or in addition, an external enterprise server may provide information directly to a local enterprise server and the local enterprise server may implement a rule set by using the information.

Figure 9:
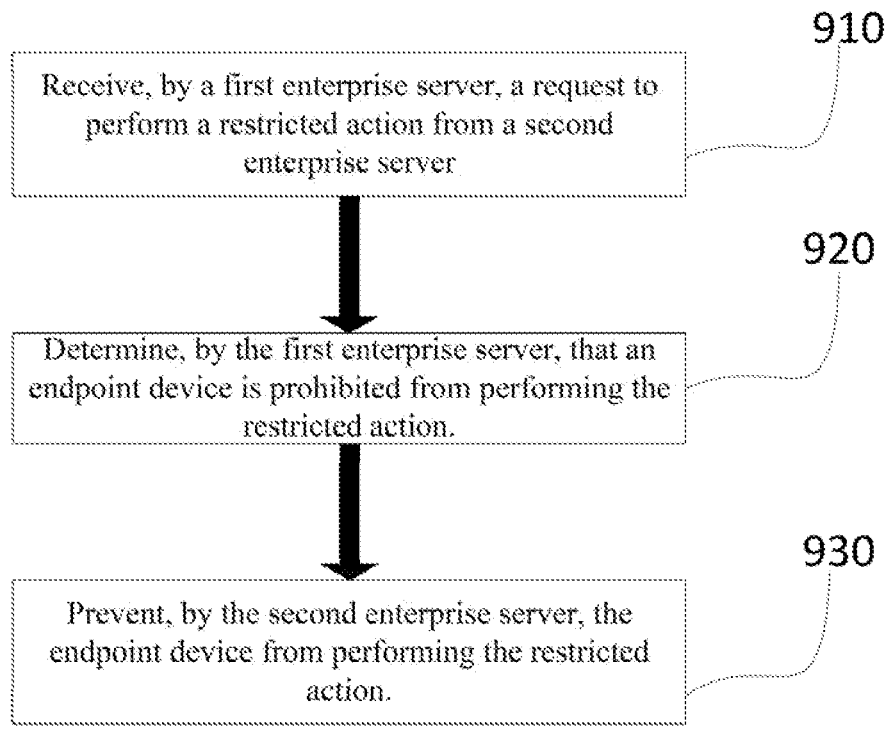
FIG. 9 shows an example process for preventing an endpoint device from performing a restricted action based on a determination by an indirect enterprise server, according to an implementation of the disclosed subject matter.

According to an implementation of the disclosed subject matter, as shown in FIG. 9 at step 910, a local enterprise server may receive a request to perform a restricted action (e.g., access data) from an external enterprise server in communication with an endpoint device that initiated the request. The external enterprise server may be physically or topographically remote from the local enterprise server and may provide a different service than the local enterprise server. This configuration may be adopted to address issues including, but not limited to, communication latencies, platform performance and compatibility with different code execution environments or the like. As an example, the local enterprise server may provide a video streaming service and the external enterprise server may provide an audio streaming service. At step 920, the local enterprise server may analyze the request to perform the restricted action and determine that the endpoint device is prohibited from performing the restricted action. Accordingly, the local enterprise server may transmit the determination and the external enterprise server may prevent the endpoint device from performing the restricted action at step 930. Continuing the previous example, the audio enterprise may receive and forward a request for audio playback to the video enterprise server. The video enterprise server may analyze the request in view of a rule set based on a policy containing device type based conditions as disclosed herein. The video enterprise server may determine that the mobile phone that initiated the request is prohibited from receiving access based on the policy. Accordingly, the video enterprise server may provide the result to the audio enterprise server which may prohibit the mobile phone from gaining access to the requested data. Notably, the local enterprise server may analyze an access request transmitted to the local enterprise server from an external enterprise server based on a rule set that governs the remote server but is hosted on and assessed by the local server.

As disclosed herein, a policy may define a restricted action for an endpoint device. The restricted action may be any applicable action that can be managed by an enterprise server such as, data transmission, information transmission, data access, content editing, data submission, data allocation, or the like and may include a file, software, a document, values, figures, account access, financial information, itinerary information, programmed information, media content, address information, or the like. As an example a policy may define conditions that allow an endpoint device to receive flight information for a user. The policy may require that the endpoint device is a registered device corresponding to the user account that the itinerary is for. Additionally, the policy may require that any financial information corresponding to the itinerary is not provided to the endpoint device with the itinerary unless the location corresponding to the endpoint device matches with an entry from a predetermined list of approved countries. Notably, a request received by an endpoint device may be analyzed based on a rule set at an enterprise server. The rule set may be based on a policy and may require the enterprise server to analyze one or more parameters to determine an appropriate response to the request.

According to an implementation of the disclosed subject matter, an endpoint device may transmit a restricted action request to an enterprise server. The endpoint device may be an untrusted device and may not automatically be granted access based on a request. Accordingly, an authorization of the restricted action request from the enterprise server may be required prior to the endpoint device receiving the requested data. The endpoint device maybe any applicable device capable of communicating with an enterprise server such as a mobile device, a mobile phone, a tablet, a laptop, a desktop, a set-top box, a gaming console, a vehicle, an appliance, or the like. As an example, an endpoint device may be an aircraft, and may request data regarding flight patterns from an air traffic server. The request may be analyzed by the air traffic server using a rule set based on a policy developed by an authorization server. The endpoint device may communicate with an enterprise server using any applicable communication technique such as a wireless communication or a wired communication and may communicate via a cellular network, Wi-Fi, Bluetooth, radio communication, infrared communication, satellite communication, microwave communication, ultrasonic communication, electromagnetic induction or the like. As an example, a mobile phone may be subscribed As shown in FIG. 3 at step 320, a rule set may be generated by an authorization server based on a policy. As disclosed herein, the rule set may be derived from one or more policies and may be used by an enterprise server to evaluate access and control requests. A policy may be distilled into a collection of discrete logic statements (e.g., a static statement, dynamic statement, conditional statement, etc.) that one or more enterprise servers may apply towards access and control requests. Each discrete logic statement may be a rule and a rule or a combination of multiple rules (i.e., a rule set) may be applied to an access or control request. A rule may be generated using any applicable factor such as evaluating a policy defined for the system, determining precedence and applicability of the policy, deriving discrete logical rules from policies that implement the access control logic defined in the policy, evaluating one or more rules as a whole and identifying specific rules to be enforced by an enterprise server, or the like. A rule set may be distributed, from the authorization server, to one or more enterprise servers. The same rule set may be distributed to two or more enterprise servers or two different rule sets may be distributed to two different enterprise servers, both rule sets derived from the same policy.

According to an implementation of the disclosed subject matter, as shown in FIG. 3 at step 330, an enterprise server may receive a rule set from an authorization serve and may respond to data access or control requests from an endpoint device, at step 340, based on the rule set. An enterprise server may be any server that receives a rule set from an authorization server and receives data access requests from one or more endpoint devices. For example, an enterprise server may be an e-mail server, a file server, a collaboration platform, a hosted service, a data synchronization service, an authentication server, an application server, a financial data server, a personal data server, a webserver, a firewall server, a database server, an Exchange Server®, a SharePoint Server®, or the like. As shown in FIG. 4, an enterprise server 420 may contain a broker 422 and an agent 424. It will be understood that although the broker 422 and agent 424 are shown as part of the enterprise server in FIG. 4, the broker 422 and/or agent 424 may be a separate module or may be a module on a cloud or otherwise remote service. A broker may act as the interface between the enterprise server-specific agent and the authorization server. Additionally, the broker may perform rule selection and evaluation needed to analyze individual data access requests. Accordingly, a broker may perform any applicable function such as interacting with the authorization server (e.g., responding to and processing rule updates, configuration changes, status inquiries, queue data for the authorization server based on priority), managing local rule sets, receiving and process access requests made by agents, selecting applicable rules and local cached data variables needed to evaluate a data access request, providing a permit, deny, alter, initiate other action response to a data request made by an agent, updating local data variables maintained to support threshold counts associated with one or more specific rules, logging and reporting activities to a server, logging and reporting requests for access received from Agents, rule evaluations and results, changes in local configuration and performance metrics, receiving, processing and forwarding activities received from an agent to an authorization server, or the like. An agent may monitor request for access, characterize them, and take action upon them such as permitting them, preventing them, or altering them based on communication with a broker. Accordingly, an agent may perform any applicable function such as recognizing requests for access to protected resources including data and services, characterize requests for data based on locally available data (e.g., data specific to the access request, status of host system which may include information regarding the application or service being monitored, characteristics of data or service for which access is being requested, an identity being claimed, characteristics of the network connection over which the access request was received, characteristics of the remote device exposed, included or detected in the request for access, etc.), building a request for evaluation for each request for a protected resource that may include a predefined set of data that characterizes the request, transmitting the request to a broker, receiving and processing the response received from the broker, permitting, denying or altering the request, initiating an additional action while conforming with a response from the broker, logging and reporting activities to the broker, logging and reporting requests for access observed, predefined set of characteristics of an observed request for access, changes in configuration, performance metrics, or the like. Additionally, an agent may characterize specific access requests by utilizing local log data, server processes, session parameters and communication activity characteristics.

Figure 11:
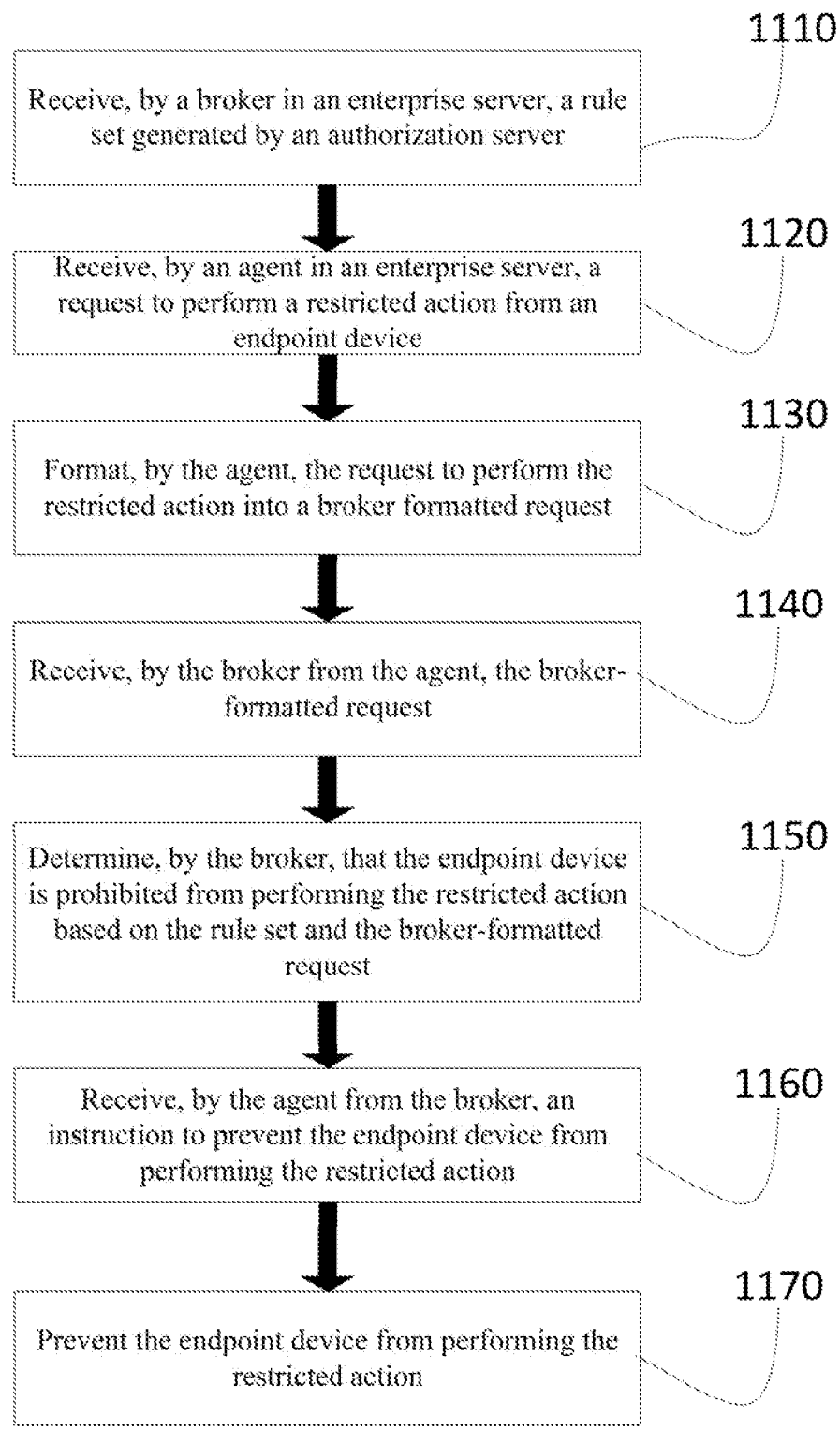
FIG. 11 shows an example process for preventing an endpoint device from performing a restricted action by a broker communicating with an agent in an enterprise server, according to an implementation of the disclosed subject matter.

As shown in FIG. 11, at step 1110, a broker 422 may receive one or more rule sets from an authorization server 410, locally store the rule set and evaluate access request queries made by an agent at step 350 in FIG. 3. A broker may receive the access request query from an agent in a broker understandable format such that the broker is able to apply a rule set to the query and either approve, deny, approve in part, or deny in part the request. At step 1120 in FIG. 11, an agent 424 may receive a data access request from an endpoint device 430, quickly detect the access request, and characterize the request including extracting context data related to the request. The agent 424 may forward the request to a broker 422 or, at step 1130, convert the request into a broker understandable format and then forward the request to the broker 422 at step 1140. At step 1150 the broker 422 may determine that endpoint device is prohibited from receiving data access and, at step 1160 instruct the agent 424 to prevent the endpoint device from receiving access and, at step 1170, the agent 424 may prevent the endpoint device from receiving access. As an example, an authorization server 410 may provide a broker 422 associated with an enterprise server 420 with a rule set based on a policy that restricts data access by a Device A between 10:00 PM and 4:00 AM EST. An agent 424 associated with the enterprise server 420 may receive a data request from the Device A at 11:00 PM EST. The agent 424 may convert the data request query into a broker understandable format and forward the request to the broker 422. The broker may determine that the data request from Device A at 11:00 PM EST violates the logic provided in the rule set and, accordingly, may deny the data request. The agent 424 may receive the data request denial from the broker 422 and prevent the endpoint device 430 from receiving the requested data. Accordingly, as shown at step 360 in FIG. 3, an enterprise server may prevent an endpoint device from performing an action based on the broker applying a rule set to the request for performing the action.

According to an implementation of the disclosed subject matter, one or more alerts may be defined for a policy. An alert may define conditions for how a notification or report based on the enforcement of a policy is handled. Alternatively or in addition, an alert may provide restricted access request based information to a user, policy administrator, authorization server, or external entity and may contain instructions for remediation, as disclosed herein. A policy based alert may be any notification or report such as an automatically generated and transmitted message corresponding to a policy enforcement action (e.g., an email, SMS message, electronic message, instant message, a popup message, an indicator, or the like generated based on an approved, denied, partially approved, or partially denied access request), an automatically generated and transmitted message corresponding to reaching a threshold point (e.g., a threshold number of access requests, access approvals, access denials, or the like), a scheduled policy enforcement report, an accumulated set of alerts gathered for a predetermined time or for a number of alerts, or the like. As an example, a mobile phone may request access to secured data from an enterprise server. The enterprise server may deny the request by analyzing the request in view of a rule set based on a policy that prohibits the mobile phone from gaining access to the data. An SMS message stating "This mobile phone is prohibited from gaining access to the request data" may be generated by the authorization server and transmitted to the mobile phone. As another example, the system may accumulate access request data for up to two hundred requests and transmit a report containing the access request data when two hundred access requests are received.

According to an implementation of the disclosed subject matter, a remediation may be defined for a policy and may contain mitigation or workflow actions to be initiated when the policy is enforced. A remediation may trigger an action by one or more other components or alter a configuration and may allow an endpoint device to gain access to data after an initial request for data is denied or, alternatively, may alert an authorization server or policy administrator to modify or circumvent a policy to allow an endpoint device to gain access to data that was previously denied. A remediation may be any applicable action such as a request for a policy administrator, manager, or user to verify an access request, initiate an out-of-band authentication, altering the configuration of an external system or data set (e.g., removing a user from an Active Directory® group, reset a user's domain password, etc.), initiating a timer (e.g., preventing access for a given time period, inserting a delay between granting access requests, approving access requests for a given time period, etc.), initiating a notification for a user containing information that may assist the user in resolving an issue, redirecting a user or access request to an alternate entity (e.g., redirecting to an entity that conducts an additional assessment of the request, requests further information from the user, device, network, or external source, etc.), initiating a timeout, or the like. As an example, a mobile phone may request access to secured data from an enterprise server which denies the request based on analyzing the request in view of a rule set based on a policy that prohibits the mobile phone from gaining access to the data. The enterprise server may provide a policy administrator with an alert that includes an option to override the result by selecting an override button placed next to information regarding the data request. The policy administrator may select the override button and the mobile phone may gain access to the data.

Figure 8:
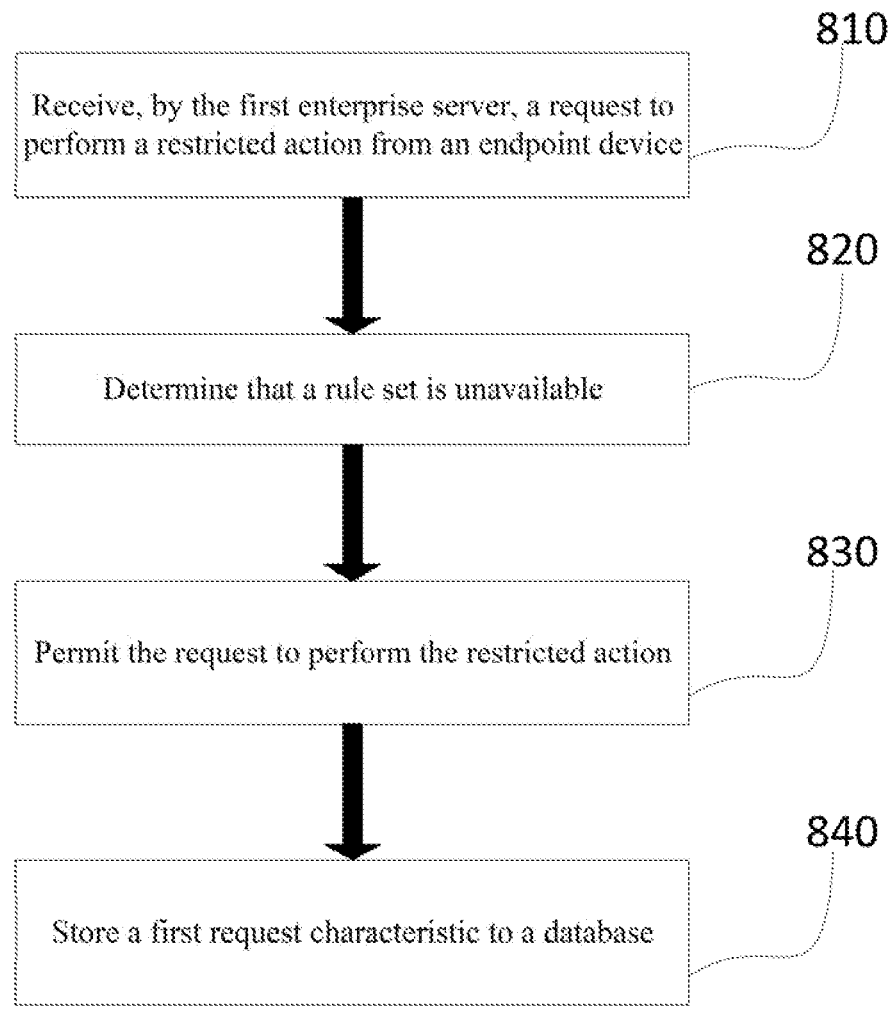
FIG. 8 shows an example process for permitting a request based on an unavailable rule set, according to an implementation of the disclosed subject matter.

According to an implementation of the disclosed subject matter, as shown in FIG. 8 at step 810, an agent associated with an enterprise server may receive an access request from an endpoint device and may forward the request to a broker, as disclosed herein. The broker may determine that a valid rule set to analyze the access request is unavailable at step 820 and grant or deny the access request, at step 830, based on a predetermined setting. Notably, the predetermined setting may allow a system to continue operation when a valid rule set is unavailable for any applicable reason such as a communication failure, an enterprise server malfunction, an authorization server malfunction, an agent to broker communication failure, or the like. At step 840, the enterprise server may store a request characteristic corresponding to the access request in a database located either locally or remote from the enterprise server and transmit one or more request characteristics from one or more access requests to an authorization server. The authorization server may re-evaluate the existing policies and provide the enterprise server with updated rule set based on the one or more request characteristics. As an example, an authorization server may transmit a rule set to an enterprise server. The rule set may not be received by the enterprise server due to a transmission error. An endpoint device may transmit an access request to the enterprise server. An enterprise server agent may receive the request and forward it to an enterprise server broker. The broker may not analyze the request due to the unavailable rule set and may, based on a predetermined setting, grant the access request to the endpoint device. The broker may provide the authorization server with a request characteristic that uses this in evaluating the existing policies, generating a new rule set based on the request characteristic and the rule set may be provided to an enterprise server. The endpoint device may continue to access the requested data or, alternatively, the broker may instruct the agent to block the endpoint device from receiving the data based on the rule set. Additionally, the authorization server or enterprise server may take a corrective action to reduce the probability of the transmission error reoccurring.

According to an implementation of the disclosed subject matter, a policy may belong to a lifecycle step such as a draft step, a validation step, a test mode step, an enforcement step, and an inactive step. A policy may be in a draft step if the policy is in the process of being defined. In a draft step, the policy may not be validated and/or may be incomplete, unenforceable or conflict with an existing policy as disclosed herein. As an example, a policy administrator may initiate drafting a policy and may save the partially drafted policy prior to completing it. Accordingly, the partially drafted policy may be designated as belonging to a draft step. A policy may be in a validation step if the policy is defined and is presently being evaluated to determine if it is enforceable and/or conflicts with existing policies. The determination may be made at the authorization server that receives the drafted policy or may be provided to a remote server for validation. As an example, a policy administrator may draft a policy and submit it to an authorization server for validation. The authorization server may test the policy based on either predetermined or partially determined criteria. Accordingly, the policy being validated may be designated as belonging to a validation step. Notably, the validation may be conducted based on pre-established criteria that are provided to an authorization or remote server by a policy administrator, manager, or user.

Figure 12:
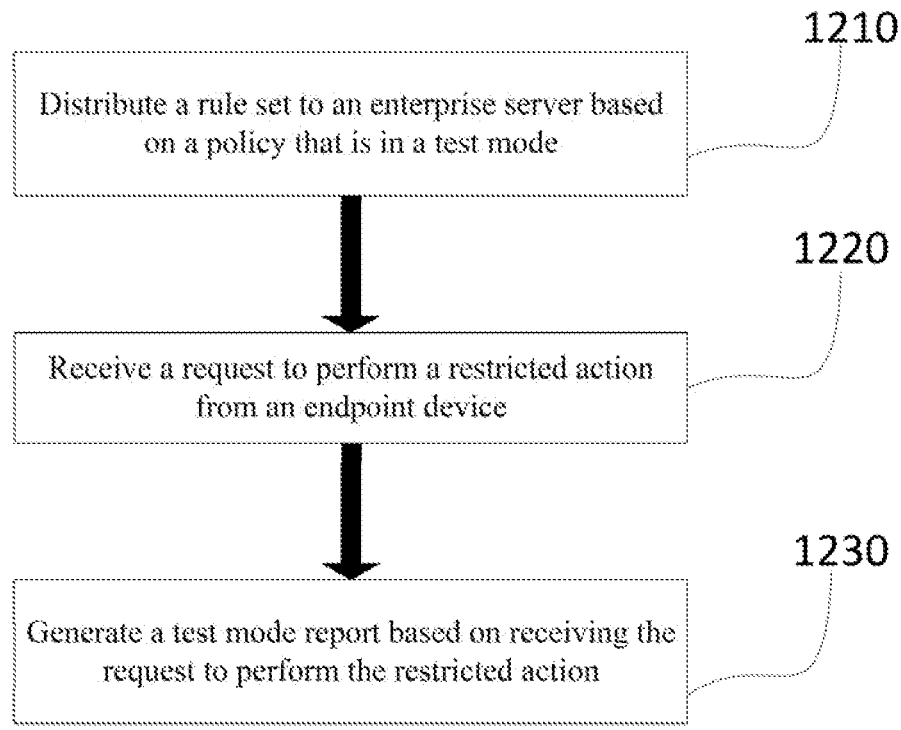
FIG. 12 shows an example process for generating a test mode report, according to an implementation of the disclosed subject matter.

A policy may be in a test mode step if the policy has been defined, validated, and deployed marked as test. As shown in FIG. 12, at step 1210, a test rule set based on the policy may be deployed to an enterprise server and the system may evaluate access control requests in view of the policy without enforcing decisions made based on the policy. Notably, the system may gather information regarding how a test rule set would analyze requests for access without enforcing any decisions made based on the rule set. As an example, a drafted policy may be validated and an authorization server may generate a test rule set based on the policy. The test rule set may be deployed to an enterprise server in a test mode and the enterprise server may receive live access requests from one or more endpoint devices at step 1220. A live access request may be a request made by an active endpoint device issuing the request intending to receive the requested access. The live access request may be analyzed by the test rule set which may provide a decision to the enterprise server. At step 1230, the enterprise server may transmit the decision to the authorization server. The authorization server may generate a report based on the decision, or store the decision and generate a report based on the decision at a later time. Alternatively, either the enterprise server or the authorization server may store a threshold number of decisions prior to generating a report, an alert or transmitting the threshold number of decisions. The threshold may be a number of required decisions, a time period during which one or more decisions is accumulated, or a number of a type of decisions. For example, an enterprise server may receive a request for access from an endpoint device and generate a report based on a decision made by a test rule set. As another example, an enterprise server may receive multiple requests for access from multiple endpoint devices and may report corresponding decisions made by a test rule set to the authorization server. The authorization server may also evaluate activity reporting from the broker and accumulate 100 decisions based on policies in test mode prior to generating a report based on the decisions.

A test mode report, generated by an authorization server, may enable a policy to belong to an enforcement step. A test mode report may contain any applicable information that enables approval of the policy such as requested data (e.g., data type, data amount, etc.), endpoint data (e.g., device type, device account, device location, device software, etc.), decision data (e.g., prevention decision, approval decision, prevention rate, approval rate, etc.), or the like. The test mode report may be prepared by an authorization server which then facilitates its review by an administrator or automate its approval based on criteria previously defined by the administrator. As part of the report preparation, the authorization server may analyze the test mode to determine if the policy, if enforced, may overburden the system, reject a threshold amount of access requests, approve a threshold amount of access requests, reject or approve a type of access request, reject or approve a type of endpoint device, conflict with an existing policy, conflict with an existing external policy, or the like.

A policy may be in an enforce mode step if the policy has been defined, validated, and approved based on the test mode. A policy in an enforce mode step may operate as disclosed herein. A policy may be placed in an inactive step if it is not validated or if it is not approved based on the test mode. A policy placed in an inactive step may be removed from the arrangement or may be stored by an authorization server. An alert may be generated and provided to a policy administrator based on being placed in an inactive step. A modified policy may be provided by the policy administrator and placed in a lifecycle step such as a draft step, a validation step, a test mode step, an enforcement step, or an inactive step.

In an illustrative example of the disclosed subject matter, as shown in FIG. 4, a policy administrator may provide an authorization server 410 with a defined and validated policy in a test step. The policy may contain the following four conditions:
1) Only provide access to Type A endpoint devices
2) Only provide access between 7:00 AM EST and 10:00 PM EST
3) Restrict access to an endpoint device located in East Dakota
4) Restrict access to an endpoint device that received access to a media server within 1 hour of a current request A test rule set may be generated based on the policy and deployed to an enterprise server 420. The enterprise server may receive multiple data access requests from multiple endpoint devices including endpoint device 430. A test mode report containing approval and prevention decision statistics may be generated by the authorization server 410 that enables assessment of the policy under test. The authorization server 410 may facilitate the review and approval of the policy based on the test mode report, administrator review, or comparison to predefined criteria and may generate an active rule set containing multiple logical statements based on the conditions and transmit the rule set to an enterprise server 420. A broker 422 associated with the enterprise server 420 may receive the active rule set. Additionally, a media server 422 may provide the authorization server 410 with an activity report describing an access request received from the endpoint device 430 by the media server at 7:30 AM EST. Upon receiving this activity report, the authorization server may process this information and provide an updated active rule set to one or more enterprise servers 420 via their broker 422. An endpoint device 430 may transmit a data access request to the enterprise server 420. An agent 424 associated with the enterprise server 420 may receive request attributes and data access request and reformat the request into a broker understandable format. The agent 424 may provide the broker 422 with the reformatted request and request attributes. The request attributes may contain the following information:
A) The endpoint device is a Type A device
B) The request time is 9:00 AM EST
C) The endpoint device location is East Dakota The broker 422 may analyze the request attributes and, in view of the 7:30 AM EST access request by the endpoint device 430, determine that conditions 1, 2, and 4 are satisfied, however condition 3 is violated. The broker 422 may instruct the agent 424 to reject the data access request and transmit a message stating "Data inaccessible at device location" to the endpoint device.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, by an authorization server, a policy that defines a restricted action for an endpoint device, the policy established by a third enterprise server providing a third service and based on at least one action monitored by the third enterprise server, wherein the restricted action is access by the endpoint device of one or more of a file with a specified file name, a URL, an application, a directory, a document, and a file location;
generating, by the authorization server, a first rule set for a first enterprise server providing a first service, the first rule set based upon the policy;
generating, by the authorization server, a second rule set for a second enterprise server, the second rule set based upon the policy, the second enterprise server providing a second service different from the first service;
distributing, by the authorization server, the first rule set to the first enterprise server; and distributing, by the authorization server, the second rule set to the second enterprise server.

2. The method of claim 1, further comprising:
receiving, by the first enterprise server, a request to perform the restricted action from an endpoint device;
determining, by the first enterprise server, that the endpoint device is prohibited from performing the restricted action; and
preventing, by the first enterprise server, the endpoint device from performing the restricted action.

3. The method of claim 2, wherein the determination that the endpoint device is prohibited from performing the restricted action is based on the first rule set.

4. The method of claim 2, wherein the policy specifies that the endpoint device is prohibited from performing the restricted action.

5. The method of claim 2, wherein preventing the endpoint device from performing the restricted action is based on an authentication of a claimed identity from the endpoint device.

6. The method of claim 2, further comprising:
comparing an attribute received from the endpoint device to one or more known values;
determining that the attribute does not correspond to one or more known values; and
preventing the endpoint device from performing the restricted action based on the determination.

7. The method of claim 6, wherein the attribute is a claimed identity.

8. The method of claim 6, wherein determining that the attribute does not correspond to one or more known attributes comprises determining if the attribute is a member of a known group.

9. The method of claim 6, wherein the attribute is an authentication credential.

10. The method of claim 6, wherein the attribute is a past activity selected from a group consisting of an access request, an authentication activity, a network activity, and a policy violation.

11. The method of claim 6, wherein the attribute is related to a unique device or category of devices.

12. The method of claim 2, wherein preventing the endpoint device from performing the restricted action is based on a past activity associated with data associated with the restricted action.

13. The method of claim 2, wherein preventing the endpoint device from performing the restricted action is based at least in part on a data characteristic.

14. The method of claim 13, wherein the data characteristic is selected from a group consisting of data content, data request location, past data storage location, and data identification information.

15. The method of claim 2, wherein preventing the endpoint device from performing the restricted action is based at least in part on a system status.

16. The method of claim 15, wherein the system status is selected from a group consisting of a system security state, a user defined policy, and a system processing load.

17. The method of claim 2, further comprising:
determining an amount of data accessed by the endpoint device during a first time frame;
determining that the amount of data accessed exceeds a data access threshold amount; and
wherein the preventing the endpoint device from performing the restricted action is based on the determination that the amount of data accessed exceeds a data access threshold amount.

18. The method of claim 2, further comprising:
determining a type of data accessed by the endpoint during a first time frame;
determining that the type of data accessed varies more than a threshold amount than a currently requested data; and
wherein the preventing the endpoint device from performing the restricted action is based on the determination that the type of data accessed varies more than a threshold amount than a currently requested data.

19. The method of claim 18 wherein the type of data is selected from a group consisting of a hash, a filename, and a signature.

20. The method of claim 2, further comprising:
determining a current characteristic for an endpoint device from which a second request for performing a second restricted action is received; and
comparing the current characteristic with a previously determined characteristic for the endpoint device from which a first request for performing a first restricted action is received,
wherein the preventing the endpoint device from performing the restricted action is based on the comparing the current characteristic with the previously determined characteristic for the endpoint device from which the first request for performing a first restricted action is received.

21. The method of claim 20, wherein the comparison of the current characteristic to the previously determined characteristic is based on a characteristic selected from the group consisting of a device make, an operating system version, a device model, an application loaded on the device, an identity associated with the request, and a device location.

22. The method of claim 2, wherein preventing the endpoint device from performing the restricted action is based, at least in part, on a time restriction.

23. The method of claim 2, wherein preventing the endpoint device from performing the restricted action is based, at least in part, on a characteristic frequency.

24. The method of claim 2, wherein the endpoint device is prevented from performing the restricted action is while located in a restricted location.

25. The method of claim 2, wherein the endpoint device is prevented from performing the restricted action while located outside an allowed location.

26. The method of claim 2, further comprising generating an alert based on evaluating the request for the restricted action.

27. The method of claim 26, wherein the alert is transmitted via a communication channel selected from the group consisting of an electronic mail, an electronic message, an instant message, a popup message, an SMS message, and an indicator.

28. The method of claim 27, further comprising:
accumulating a threshold number of alerts;
transmitting the accumulated alerts once the threshold number has been reached.

29. The method of claim 27, further comprising:
accumulating alerts received prior to a predetermined time;
transmitting one or more accumulated alerts subsequent to the expiration of the time.

30. The method of claim 2, wherein distributing the first rule set to the first enterprise server further comprises a rule set validation process.

31. The method of claim 2, further comprising generating a system log wherein the system log contains data selected from the group consisting of an authorization requestor, an authorization request device, a requested data type, and a permission value.

32. The method of claim 2, further comprising generating an alert, by the authorization server, based on preventing the endpoint device from performing the restricted action.

33. The method of claim 1, wherein the policy specifies that the endpoint device is allowed to perform the restricted action.

34. The method of claim 1, further comprising:
reporting an activity from the first enterprise server to the authorization server; and
updating the first rule set based on the reported activity.

35. The method of claim 34, further distributing, by the authorization server, the updated first rule set to at least the first enterprise server.

36. The method of claim 1, further compromising:
reporting an event from a system component to the authorization server; and
updating the first rule set based on the reported event.

37. The method of claim 36, wherein an event includes at least one component selected from the group consisting of an identity, an endpoint device, a requested object, a requested service, a time, a system component and a location.

38. The method of claim 36, wherein a system component is selected from a group consisting of a network device, a directory service, an authentication service, a mobile device management system, a logging system, a Security Information and Event Management system, and an operating system log.

39. The method of claim 38, wherein the logging system is a syslog.

40. The method of claim 36, further distributing, by the authorization server, the updated first rule set to at least the first enterprise server.

41. The method of claim 1, wherein the endpoint device is an untrusted device.

42. The method of claim 1, wherein the first rule set and the second rule set are the same.

43. The method of claim 1, wherein the authorization server updates a configuration of an enterprise system based on the policy.

44. The method of claim 1, wherein the policy is defined by a policy administrator.

45. The method of claim 44, further comprising:
providing a user interface to the policy administrator; and
receiving policy parameters from the policy administrator.

46. The method of claim 1, wherein the first rule set comprises at least one discrete logic statement having at least one component selected from the group consisting of a subject, a condition, an action, and a remediation.

47. The method of claim 46, wherein a subject includes at least one component selected from the group consisting of a group, an individual, a file, a directory, a site, a service, and a server.

48. The method of claim 46, wherein a condition includes at least one component selected from the group consisting of a user identity, an endpoint identity, a requested data type, a time of day, a date, a download limit, and an access request limit.

49. The method of claim 46, wherein an action includes at least one component selected from the group consisting of an alert, a log, a prevent, and a permit.

50. The method of claim 46, wherein the discrete logic statement is a type selected from the group consisting of a static, a dynamic, and a conditional.

51. The method of claim 46, wherein a remediation includes at least one component selected from the group consisting of a third party approval, providing notice to user, initiating workflow to correct, an out-of-band authentication, and a timeout.

52. The method of claim 1, further comprising:
receiving, by the first enterprise server, a request to perform the restricted action from a third enterprise server;
determining, by the first enterprise server, that an endpoint device is prohibited from performing the restricted action; and
preventing, by the third enterprise server, the endpoint device from performing the restricted action.

53. A system comprising:
a database;
a processor device in connection with the database, the processor device configured to:
receive, by an authorization server, a policy that defines a restricted action for an endpoint device, the policy established by a third enterprise server providing a third service and based on at least one action monitored by the third enterprise server, wherein the restricted action is access by the endpoint device of one or more of a file with a specified file name, a URL, an application, a directory, a document, and a file location;
generate, by the authorization server, a first rule set for a first enterprise server providing a first service, the first rule set based upon the policy;
generate, by the authorization server, a second rule set for a second enterprise server, the second rule set based upon the policy, the second enterprise server providing a second service different from the first service;
distribute, by the authorization server, the first rule set to the first enterprise server; and
distribute, by the authorization server, the second rule set to the second enterprise server.

54. The system of claim 53, further configured to:
receive, by the first enterprise server, a request to perform the restricted action from an endpoint device;
determine, by the first enterprise server, that the endpoint device is prohibited from performing the restricted action; and
prevent, by the first enterprise server, the endpoint device from performing the restricted action.

* * * * *